United States Patent
Tseng

(10) Patent No.: US 6,305,974 B1
(45) Date of Patent: Oct. 23, 2001

(54) CONNECTING STRUCTURE FOR CONDUCTING WIRES OF CEILING FAN

(76) Inventor: Tien Fu Tseng, No. 18, Chen Hsing Tung Street, Wu Feng Hsiang, Taichung Hsien (TW)

( * ) Notice: Subject to any disclaimer, the term of this patent is extended or adjusted under 35 U.S.C. 154(b) by 0 days.

(21) Appl. No.: 09/718,336

(22) Filed: Nov. 24, 2000

(51) Int. Cl.$^7$ .................................................. H01R 13/60
(52) U.S. Cl. ........................ 439/537; 439/440; 248/342; 403/316
(58) Field of Search ..................................... 439/439, 440, 439/441, 537, 576; 403/322.2, 321, 315, 316, 302, 376; 248/342, 343, 344

(56) References Cited

U.S. PATENT DOCUMENTS

| | | | |
|---|---|---|---|
| 4,810,207 | * 3/1989 | Butterfield | 439/529 |
| 5,090,654 | * 2/1992 | Ridings et al. | 248/343 |
| 5,385,323 | * 1/1995 | Garelick | 248/161 |
| 5,411,350 | * 5/1995 | Breault | 403/350 |
| 5,462,412 | * 10/1995 | Scofield et al. | 416/210 |
| 5,720,569 | * 2/1998 | Jonischkeit et al. | 403/109 |
| 5,900,583 | * 5/1999 | Russo | 174/61 |
| 6,116,559 | * 9/2000 | Lackey | 248/343 |

* cited by examiner

Primary Examiner—Brian Sircus
Assistant Examiner—Thanh-Tam Le
(74) Attorney, Agent, or Firm—Rosenberg, Klein & Lee

(57) ABSTRACT

A Connecting structure for conducting wires of ceiling fan, including a fixing bracket fixed on a ceiling or a wall, a base seat disposed on a motor of the ceiling fan and a connecting rod connected between the base seat and the fixing bracket. A fixing seat and a slide seat are disposed in the connecting rod. By means of pushing a rail passing through the fixing seat, the slide seat is driven to slide within the connecting rod. The slide seat are formed with two wire holes and the fixing seat are formed with through holes corresponding to the wire holes. The conducting wires are passed through the through holes and inserted into the wire holes. A connecting wire is conducted from the wire hole out of a top end of the connecting rod to connect with a wire socket which is connected with a power supply so as to easily electrically connect the conducting wires of the ceiling fan with the power wires.

7 Claims, 7 Drawing Sheets

CONNECTING STRUCTURE FOR CONDUCTING WIRES OF CEILING FAN

BACKGROUND OF THE INVENTION

The present invention relates to a connecting structure for conducting wires of ceiling, fan, which enables a user to DIY in stall the ceiling fan and easily connect the conducting wires of the ceiling fan with the power wires.

FIGS. 9 and 10 show the connecting structure for conducting wire of a conventional ceiling fan. After the ceiling fan is manufactured, generally the motor 81, connecting rod 82, connector 83 and fixing bracket 84 are separately packed. When mounting the ceiling fan, the conducting wire 801 of the motor 81 is passed through the connecting rod 82 and a pin member 85 is passed through the connecting rod 82 and a base seat 802 of the motor 81 to fix the connecting rod 82 on the motor 81. The other end of the connecting rod 82 is connected with the connector 83 by a pin member 86 and bolts 87. By means of the connector 83, the connecting rod 82 is mounted on the fixing bracket 84 fixed on the ceiling. Finally, the conducting wire 801 is conducted out of the connecting rod 82 and connected with power wire 88 by a wire connecting collar 89 which is twisted to tighten the conducting wire 801.

The conducting wire 801 has a considerable length so that when packed, the conducting wire 801 must be wound. When passing through the conducting wire 801 through the connecting rod 82, it is necessary to first unwind the conducting wire 801 into a straight state. This procedure is quite troublesome. Furthermore, the conducting wire 801 is conducted through the connecting. rod 82 and tends to tangle and abrade the inner circumference of the connecting rod 82. In case the skin of the conducting wire 801 is worn out, the conducting wire 801 may contact with the metal-made connecting rod 82 to cause short circuit and fire. Moreover, the conducting wire 801 is connected with the power wire 88 by an additional wire connecting collar 89 which is twisted. The wire connecting collar 89 is liable to loosen and lead to poor contact. Also, for a DIY user, it is complicated and difficult to conduct and connect the wire.

SUMMARY OF THE INVENTION

It is therefore a primary object of the present invention to provide a connecting structure for conducting wires of ceiling fan. A fixing seat and a slide seat are disposed in a connecting rod connected between the base seat and the fixing bracket. By means of pushing a rail passing through the fixing seat, the slide seat is driven to slide within the connecting rod. The slide seat are formed with two wire holes and the fixing seat are formed with through holes corresponding to the wire holes. The conducting wires are passed through the through holes and inserted into the wire holes. A connecting wire is conducted from the wire hole out of a top end of the connecting rod to connect with a wire sockets which is connected with a power supply so as to easily electrically connect the conducting wires of the ceiling fan with the power wires.

The present invention can be best understood through the following description and accompanying drawings wherein:

DETAILED DESCRIPTION OF THE PREFERRED EMBODIMENTS

Figure 1:
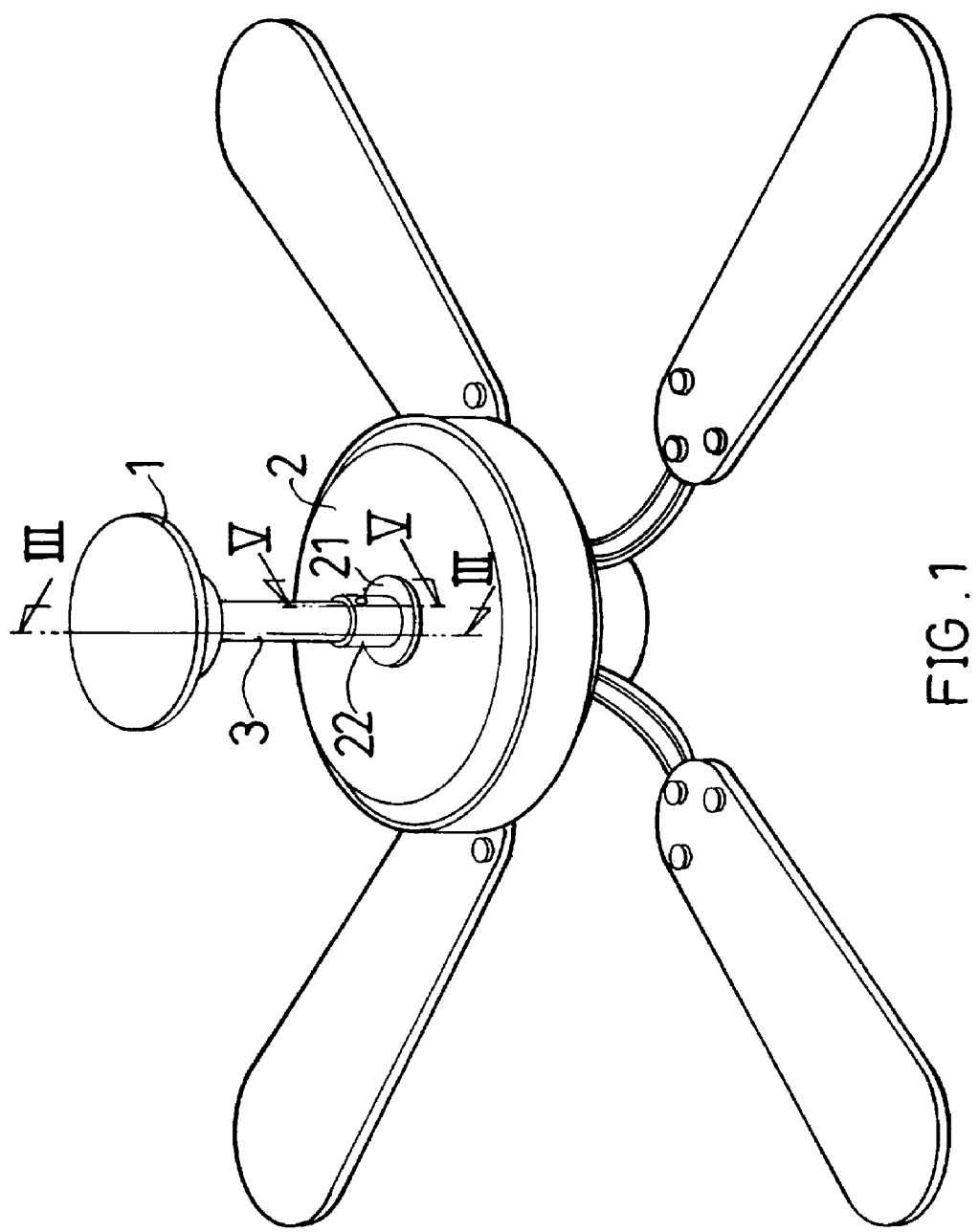
FIG. 1 is a perspective assembled view of the present invention.
Figure 2:
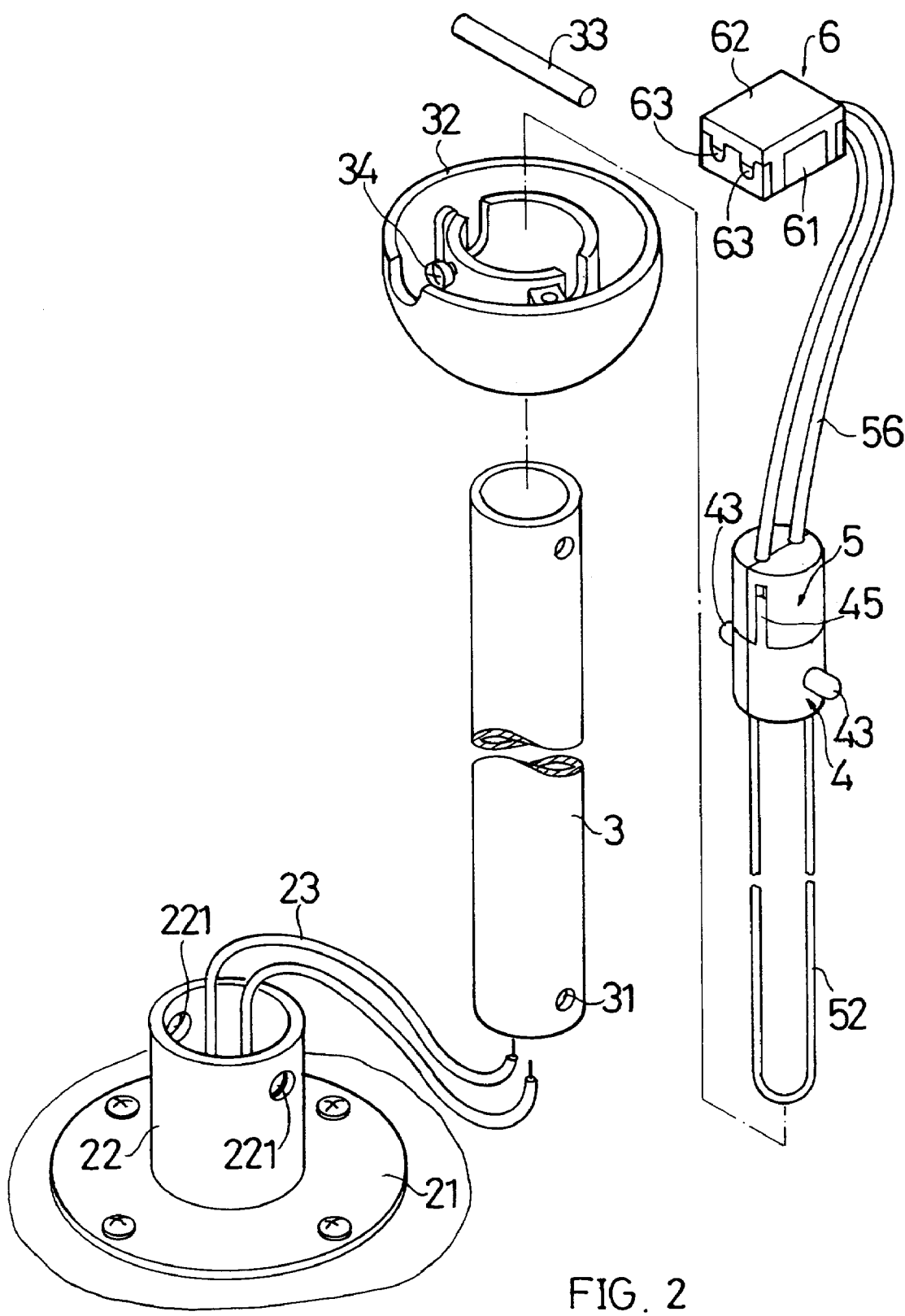
FIG. 2 is a perspective exploded of the present invention.
Figure 3:
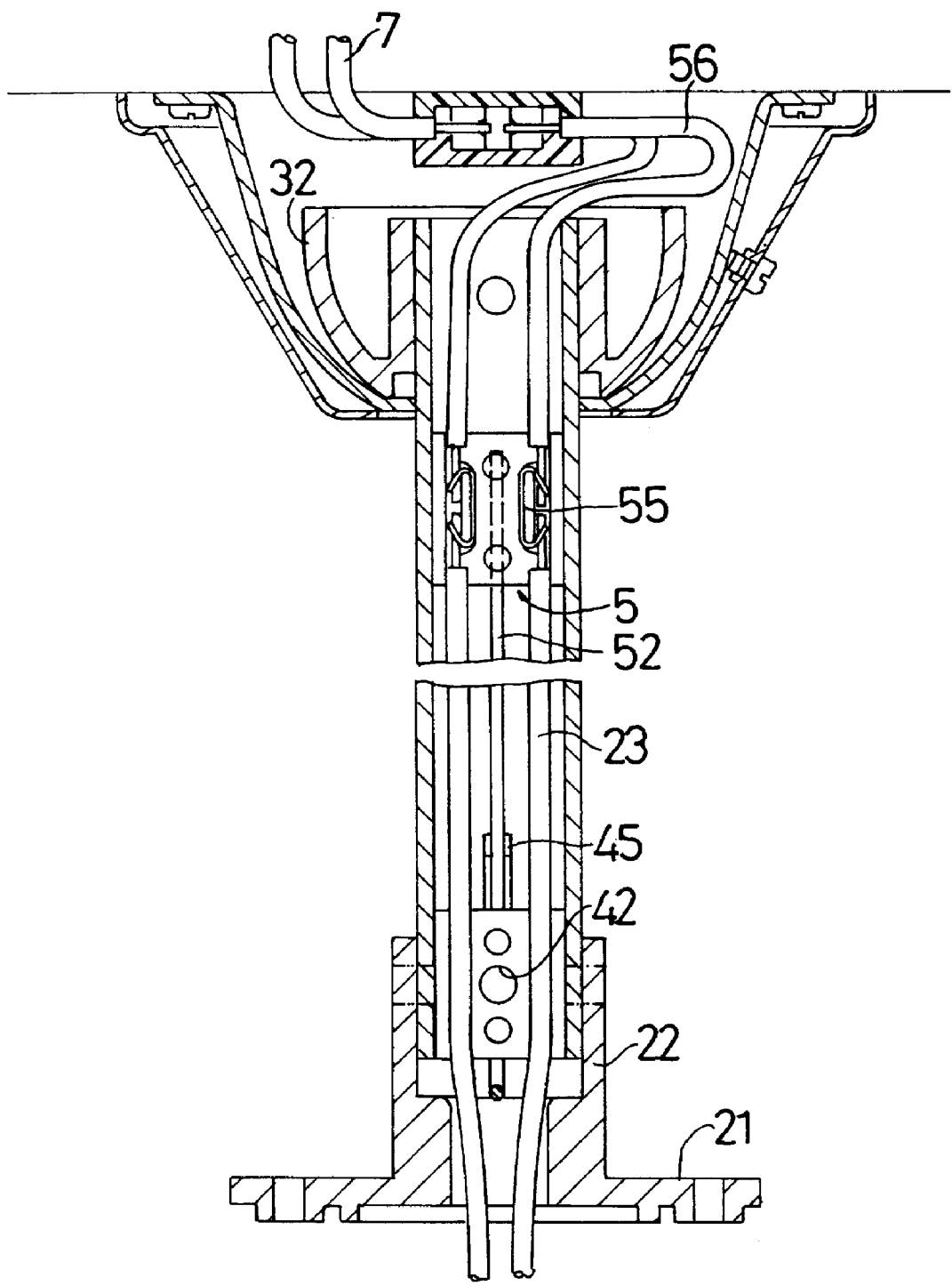
FIG. 3 is a sectional view taken along line III—III of FIG. 1.
Figure 4:
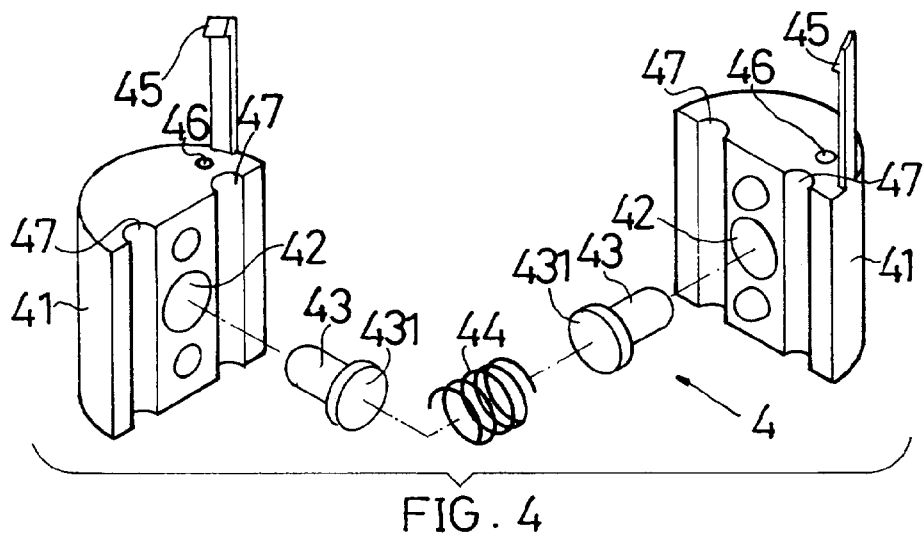
FIG. 4 is a perspective exploded of the fixing seat of the present invention.
Figure 5:
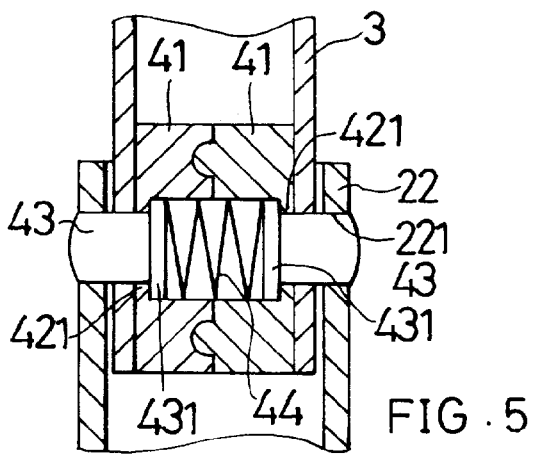
FIG. 5 is a sectional view taken along line V—V of FIG. 1.
Figure 6:
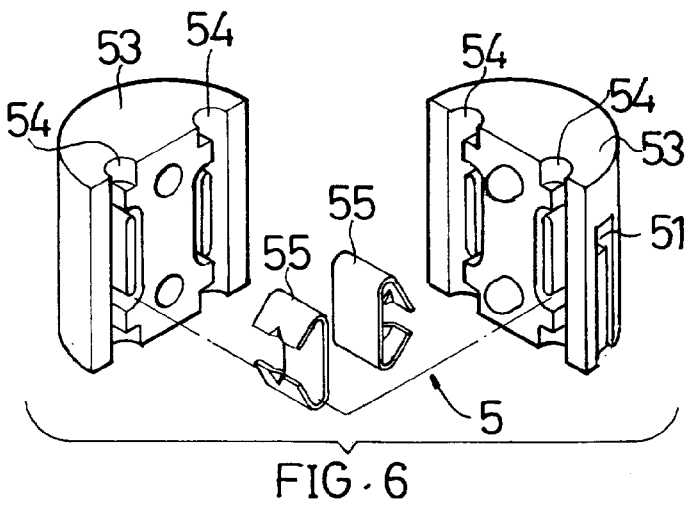
FIG. 6 is a perspective exploded of the slide seat of the present invention.
Figure 7:
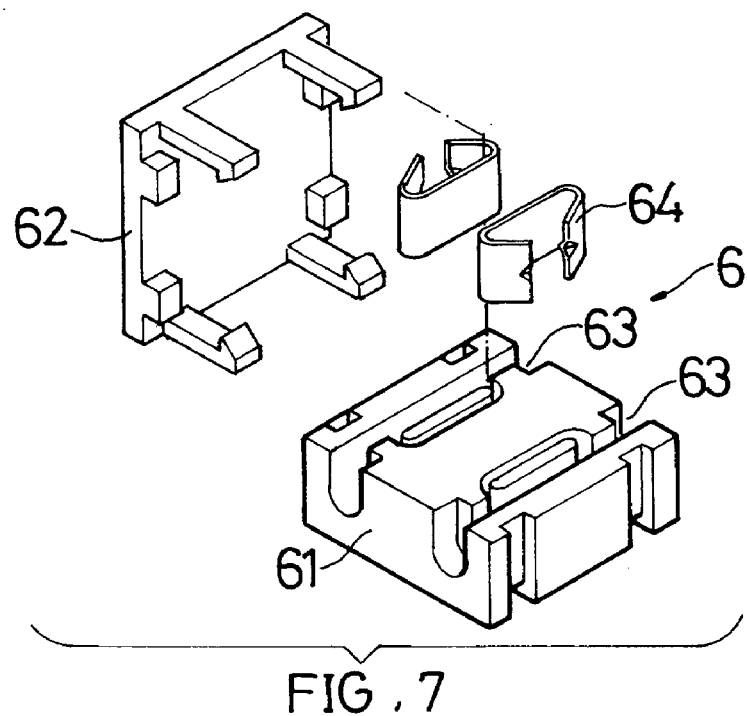
FIG. 7 is a perspective exploded of the wire socket of the present invention.

Please refer to FIGS. 1 to 8. The connecting structure for conducting wires of ceiling fan of the present invention includes a fixing bracket 1 fixed on a ceiling or a wall, a base seat 21 disposed on a motor 2 and a connecting rod 3 connecting the base seat 21 with the fixing bracket 1.

The connecting rod 3 is hollow. A fixing seat 4 is disposed in the connecting rod 3 at bottom end thereof. A lower section of the connecting rod 3 is formed with a pin hole 31. The fixing seat 4 is composed of two semicircular blocks 41. Each semicircular block 41 is formed with a transverse hole 42. An outer end of the transverse hole 42 is formed with a small diameter section 421. A push pin 43 is passed through the transverse hole 42. An inner end of the push pin 43 is formed with a flange 431 stopped by the small diameter section 421 of the transverse hole 42. A spring 44 is disposed between the two push pins 43 for pushing the push pins 43 outward. After the fixing seat 4 is assembled, the push pins 43 and the spring 44 are arranged in a form of a spring pin. The base seat 21 is formed with a central yoke 22 in which the connecting rod 3 is inserted. The yoke 22 is formed with a radial locating hole 221. The push pins 43 can extend into the locating hole 221 to lock the base seat 21, connecting rod 3 and fixing seat 4 together.

In addition, a slide seat 5 is disposed in the connecting rod 3. The slide seat 5 has a profile complementary to the profile of inner circumference of the connecting rod 3. The fixing seat 4 has more than one upward extending hook 45. The slide seat 5 is formed with a channel 51 corresponding to the hook 45 for latching therewith. In addition, the slide seat 5 has a downward extending U-shaped rail 52. The fixing seat 4 is formed with through holes 46 for the rail 52 to pass therethrough. By means of pushing the rail 52, the slide seat 5 is driven to slide within the connecting rod 3. The slide seat 5 is composed of two semicircular blocks 53 and formed with two wire holes 54. A substantially C-shaped metal leaf spring 55 is disposed in each wire holes 54. The conducting wires 23 of the motor 2 and a set of connecting wires 56 are inserted into two ends of the wire holes 54 and pressed by and engaged with the leaf spring 55, whereby the conducting wires 23 and the connecting wires 56 are electrically connected with each other. The fixing seat 4 is formed with through holes 47 corresponding to the wire holes 54 for the conducting wires 23 to pass therethrough. Each connecting wire 56 is conducted out of the top end of the connecting rod 3 to connect with a wire socket 6.

The wire socket 6 is composed of a main body 61 and a cover 62. The main body 61 is formed with two wire insertion holes 63 passing through the main body 61. A substantially C-shaped metal leaf spring 64 is disposed in middle section of each wire insertion hole 63. After the connecting wires 56 and a set of power wires 7 are inserted into two ends of the wire insertion holes 63, the connecting wires 56 and the power wires 7 are pressed by and engaged with the leaf spring 64 and electrically connected with each other.

When manufactured in a factory, the fixing seat 4, slide seat 5 and wire socket 6 are previously assembled. The hook 45 of the fixing seat 4 is latched in the channel 51 of the slide seat 5 to connect. the fixing seat 4 with the slide seat 5. The fixing seat 4 and the slide seat 5 are installed in the connecting rod 3. The push pins 43 of the fixing seat 4 is fitted into the pin hole 31 of the connecting rod 3 to locate the fixing seat 4. That is, this assembling procedure is previously completed in the factory. Therefore, after buying a ceiling fan, a consumer only needs to fix the fixing bracket 1 on the ceiling or the wall and then use the pin 33 and bolts 34 to connect the connecting rod 3 with the connector 32. At this time, the DIY consumer only needs to pass the conducting wires 23 of the motor 2 through the through holes 47 of the fixings seat 4 and insert the conducting wires 23 into the wire holes 54 to be pressed by and engaged with the metal leaf springs 55. Then the rail 52 is pushed to drive the slide seat 5 upward. Then the connecting rod 3 is inserted into the yoke 22 of the base seat 21 with the push pins 43 fitted into the locating holes 221 of the yoke 22 so as to lock the connecting rod 3 with the base seat 21. Then, by means of the connector 32, the connecting rod 3 is mounted on the fixing bracket 1 fixed on the ceiling or the wall. Finally, the power wires 7 are inserted into the wire insertion holes 63 of the wire socket 6 to electrically connect with the connecting wires 56. At this time, the connection of the conducting wires of the ceiling fan is completed. By means of the fixing seat 4, slide seat 5 and wire socket 6, the connection of the conducting wires can be easily completed by the DIY consumer in such a manner that the consumer only needs to respectively insert the conducting wires 23 and the power wires 7 into the wire holes 54 of the slide seat 5 and the wire insertion holes 63 of the wire socket 6.

Figure 8:
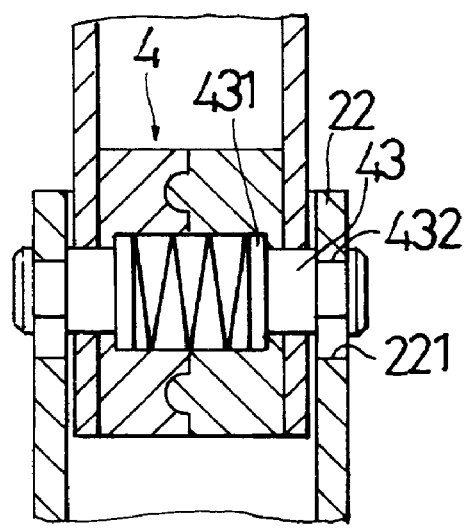
FIG. 8 is a sectional view of a second embodiment of the present invention.
Figure 9:
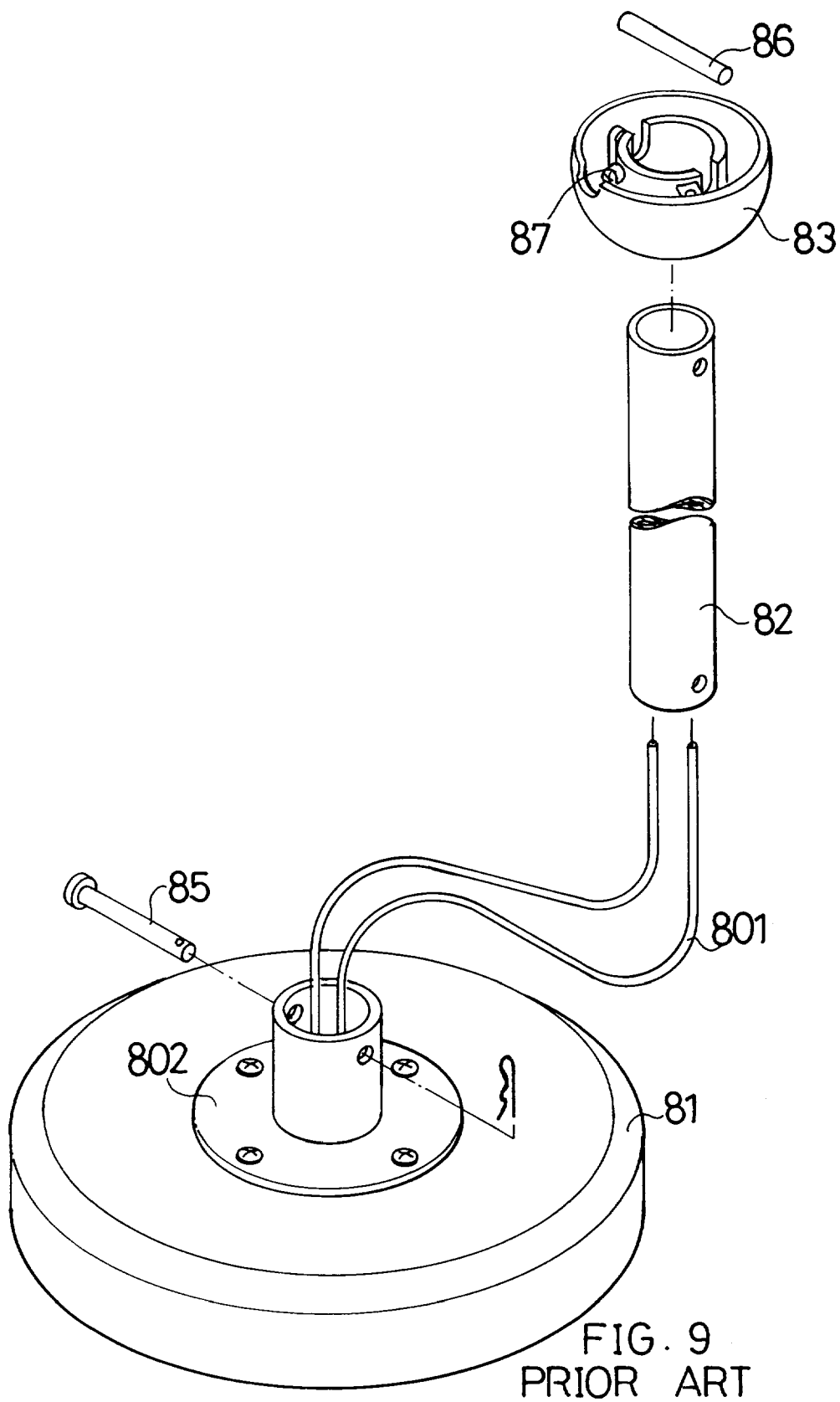
FIG. 9 shows the connecting structure for conducting wires of a conventional ceiling fan.
Figure 10:
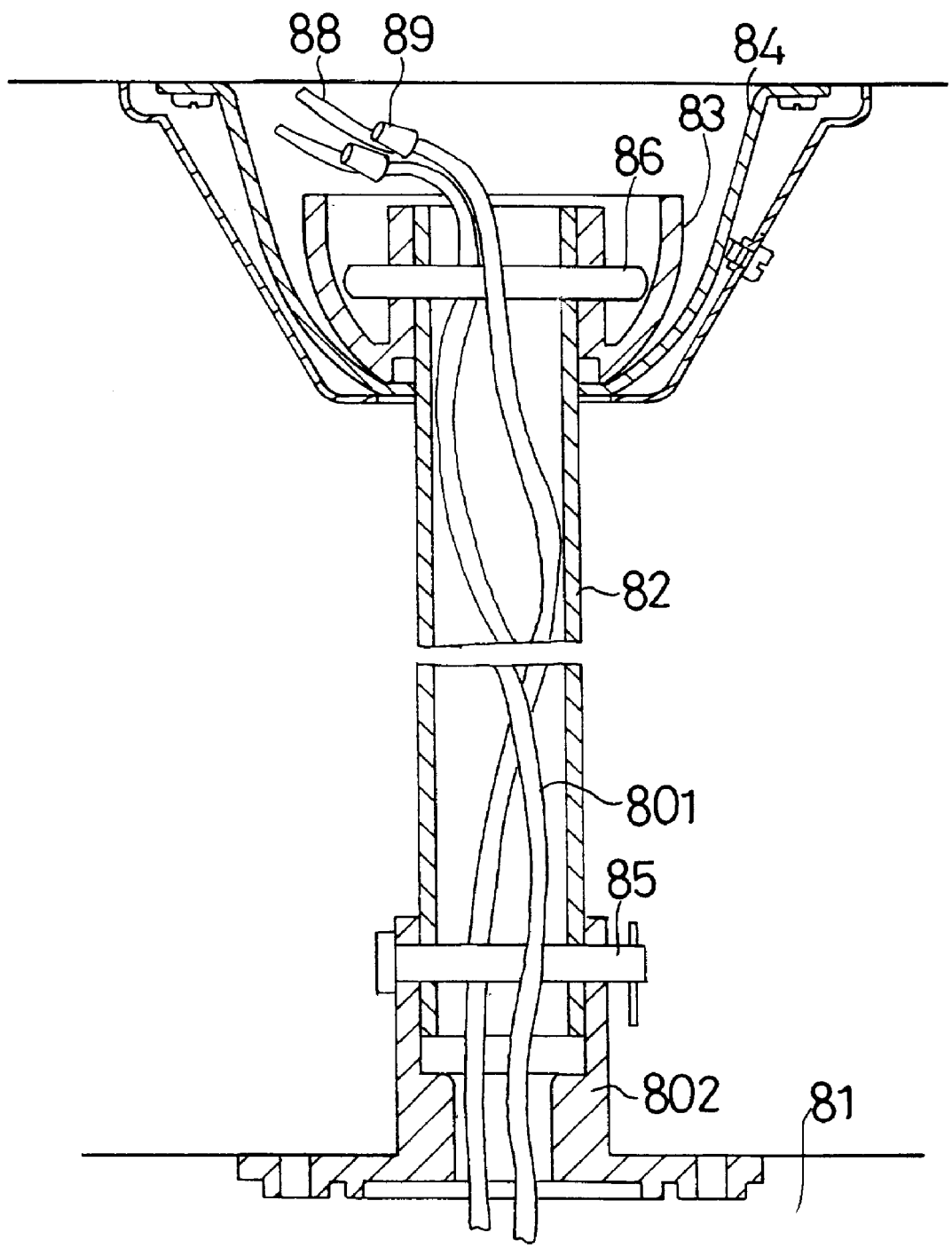
FIG. 10 is a sectional view showing the connecting structure for conducting wires of the conventional ceiling fan.

FIG. 8 shows a second embodiment of the present invention, in which each push pin 43 of the fixing seat is formed with an annular groove 432 corresponding to the locating hole 221 of the yoke 22 of the base seat 21. When assembled, the push pin 43 is engaged with and located in the locating hole 221 without loosening or detachment. Furthermore, the connecting wires 56 can be previously soldered with the metal leaf spring 64 of the wire socket 6 and the metal leaf spring 55 of the slide seat 5 in the factory. Also, the metal leaf spring 64 of the wire socket 6 and the metal leaf spring 55 of the slide seat 5 can be L-shaped. The conducting wires 23 and the power wires 7 are respectively inserted into the other ends of the slide seat 5 and the wire socket 6.

The above embodiments are only used to illustrate the present invention, not intended to limit the scope thereof. Many modifications of the above embodiments can be made without departing from the spirit of the present invention.

What is claimed is:

1. A Connecting structure for conducting wires of ceiling fan, comprising a fixing bracket fixed on a ceiling or a wall, a base seat disposed on a motor of the ceiling fan and a connecting rod connected between the base seat and the fixing bracket, the connecting rod being hollow, a fixing seat being disposed in the connecting rod at bottom end thereof, a slide seat being disposed in the connecting rod, the slide seat having a profile complementary to the profile of inner circumference of the connecting rod, the fixing seat having more than one upward extending hook, the slide seat being formed with a channel corresponding to the hook for latching therewith, the slide seat further having a downward extending rail, the fixing seat being formed with through holes for the rail to pass therethrough, whereby by means of pushing the rail, the slide seat is driven to slide within the connecting rod, the slide seat being formed with two wire holes, the fixing seat being formed with through holes corresponding to the wire holes for the conducting wires to pass therethrough, a metal leaf spring being disposed in each wire hole of the slide seat for clamping and fixing the conducting wires, the metal leaf spring being connected with a connecting wire, the connecting wire being conducted out of a top end of the connecting rod to connect with a wire socket which is connected with a power supply.

2. A Connecting structure for conducting wires of ceiling fan as claimed in claim 1, wherein a lower section of the connecting rod is formed with a pin hole, the fixing seat being formed with a transverse hole corresponding to the pin hole, the base seat being formed with a central yoke in which the connecting rod is inserted, the yoke being formed with a radial locating hole, a pin being passed through the locating hole, pin hole and the transverse hole to lock the base seat, connecting rod and fixing seat together.

3. A Connecting structure for conducting wires of ceiling fan as claimed in claim 2, wherein the pin is a spring pin disposed in the transverse hole of the fixing seat, two ends of the spring pin extending out of the connecting rod from the fixing seat, whereby when the connecting rod is inserted into the yoke of the base seat, the two ends of the spring pin extend out of the locating holes of the yoke to locate the connecting rod in the yoke.

4. A Connecting structure for conducting wires of ceiling fan as claimed in claim 3, wherein the fixing seat is composed of two semicircular blocks, each semicircular block being formed with a transverse hole, an outer end of the transverse hole being formed with a small diameter section, the spring pin being composed of two push pins and a spring, the push pins being passed through the transverse holes, an inner end of each of the push pins being formed with a flange stopped by the small diameter section of the transverse hole, the spring being disposed between the two push pins for pushing the push pins outward.

5. A Connecting structure for conducting wires of ceiling fan as claimed in claim 1, wherein the slide seat is composed of two semicircular blocks, a substantially C-shaped metal leaf spring being disposed in each wire holes of the slide seat, whereby after the conducting wires and the connecting wires are inserted into two ends of the wire holes, the conducting wires and the connecting wires are pressed by and engaged with the leaf spring and are electrically connected with each other.

6. A Connecting structure for conducting wires of ceiling fan as claimed in claim 1, wherein the wire socket is composed of a main body and a cover, the main body being formed with two wire insertion holes passing through the main body, a substantially C-shaped metal leaf spring being disposed in middle section of each wire insertion hole, whereby after the connecting wires and power wires are inserted into two ends of the wire insertion holes, the connecting wires and the power wires are pressed by and engaged with the leaf spring and are electrically connected with each other.

7. A Connecting structure for conducting wires of ceiling fan as claimed in claim 3, wherein two ends of the spring pin are formed with annular grooves corresponding to the locating hole of the yoke of the base seat for engaging with the locating hole.

* * * * *